United States Patent Office 3,734,906
Patented May 22, 1973

3,734,906
CARBAMATE AND THIOCARBAMATE DERIVATIVES OF 6-ISOCYANATO PENICILLANIC ACID SACCHARIMIDE
James L. Diebold, Broomall, and Milton Wolf, West Chester, Pa., assignors to American Home Products Corporation, New York, N.Y.
No Drawing. Filed June 3, 1971, Ser. No. 149,795
Int. Cl. C07d 99/16
U.S. Cl. 260—239.1  3 Claims

ABSTRACT OF THE DISCLOSURE

Novel antibiotic compounds have been prepared which have the following generic formula:

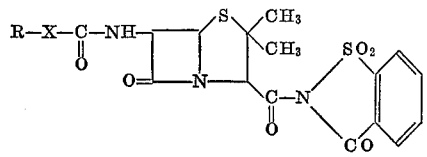

DESCRIPTION OF THE INVENTION

This invention is concerned with the preparation of novel antibiotically active penicillin type compounds of Formula I:

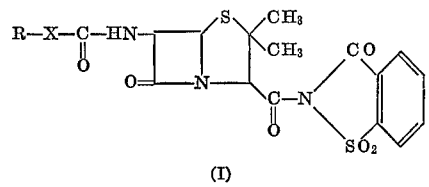

wherein R is selected from the group consisting of (lower) alkyl, phenyl, phen(lower)alkyl, naphthyl, 3-pyridyl, 4-pyridyl, mono(lower)alkylamino(lower)alkyl, di(lower) alkylamino(lower)alkyl, and quinuclidinyl; X is selected from the group consisting of sulfur and oxygen.

The compounds may be prepared by the following reaction scheme:

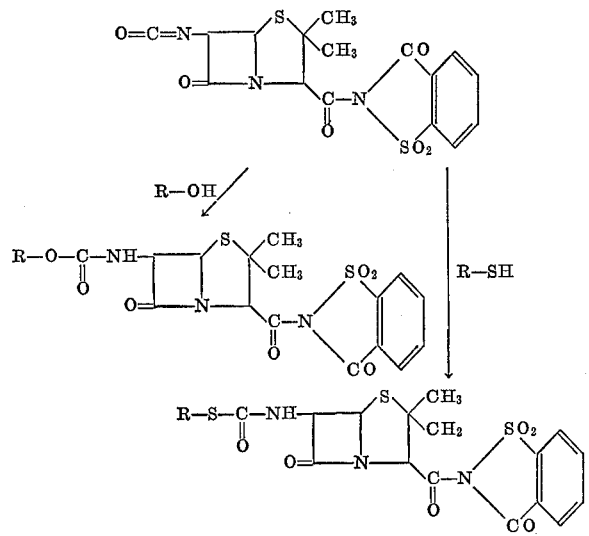

wherein R is the same as hereinabove defined.

The reactions are conducted by admixing the reactants separately in an organic solvent such as methylene chloride, tetrahydrofuran, chloroform or the like and then combining the two reactants in a suitable reaction vessel. The reaction may be run at room temperature or the reactants may be precooled and allowed to rise to room temperature. The reaction time is not critical and may vary from several hours to four or five days depending on the particular compound. The solvent is thereafter removed by evaporation or by other appropriate techniques well known to those skilled in the art.

The compounds of the invention are antibiotically active and may be used to treat infections caused by susceptible organisms. They may be used for the treatment of bovine mastitis or for growth promotion of animals such as domestic cattle and hogs. The compounds of the invention are also useful for the inhibition of Staph aureus, Smith at a concentration of less than 50 micrograms/ml. when applied in an aqueous vehicle.

As used herein and in the appended claims the term (lower)alkyl is used to include straight and branched chain hydrocarbon groups containing from 1 to about 6 carbon atoms such as methyl, ethyl, i-propyl, n-hexyl and the like.

The following examples are added to illustrate but not to limit the scope of the invention:

EXAMPLE I 3,3 - dimethyl - 7 - oxo - 2 - (3 - oxo - 1,2 - benzisothiazolin - 2 - ylcarbonyl)thio - 4 - thia - 1 - azabicyclo [3.2.0]heptane - 6 - carbamic acid S - 2 - (dimethylamino)ethyl ester, S′,S′ - dioxide 2-(dimethylamino)ethyl mercaptan was liberated from its hydrochloride by treatment of a slurry of 1.05 g. of hydrochloride (0.00740 m.) in 20 ml. of dried tetrahydrofuran with 0.81 g. of triethylamine (0.00736 m.) in 5 ml. of dried tetrahydrofuran followed by filtration of the triethylammonium chloride formed (quantitative yield). The pink filtrate was added at room temperature to a solution of 3.00 g. of 2-[(6-isocyanato-3,3-dimethyl-7-oxo - 4 - thia - 1 - azabicyclo[3.2.0]hept-2-yl)carbonyl]-1,2-benzisothiazolin-3-one 1,1-dioxide in 50 ml. of dried methylene chloride. After stirring at room temperature for 3 days, the solvent was removed by evaporation leaving a yellow solid. I.R. (in KBr) absorption maxima: 3.0µ, 5.6µ, 5.7µ, 5.95µ, 6.1µ, 6.3–6.5µ. Iodometric assay: 59%.

EXAMPLE II 3,3-dimethyl-7-oxo-2-(3 - oxo-1,2-benzisothiazolin - 2-ylcarbonyl)-4-thia-1-azabicyclo[3.2.0]heptane - 6 - carbamic acid 3-quinuclidinyl ester S′,S′-dioxide A solution of 3.00 g. of 2-[(6-isocyanato-3,3-dimethyl-7-oxo-4-thia - 1 - azabicyclo[3.2.0]hept-2-yl)carbonyl]-1,2-benzisothiazolin-3-one 1,1-dioxide (0.00736 m.) in 50 ml. of dried methylene chloride and a solution of 0.935 g. of 3-quinuclidinol and 0.2 ml. of pyridine in 20 ml. of dried methylene chloride were added together at room temperature and stirring for 19 hours. The solvent was removed by evaporation leaving a tan solid. I.R. (in KBr) absorption maxima: 2.95µ, 5.6µ, 5.75µ, 5.85µ, 6.5µ. Iodometric assay: 67%.

EXAMPLE III

By methods analogous to those employed hereinabove, the following compounds are prepared:

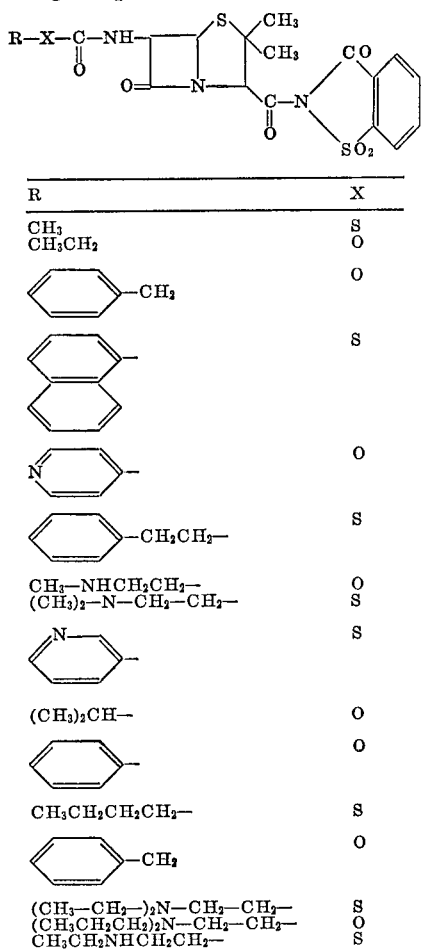

| R | X |
|---|---|
| CH₃ | S |
| CH₃CH₂ | O |
| ⌬—CH₂ | O |
| ⌬⌬ (naphthyl) | S |
| pyridyl | O |
| ⌬—CH₂CH₂— | S |
| CH₃—NHCH₂CH₂— | O |
| (CH₃)₂—N—CH₂—CH₂— | S |
| quinuclidinyl | S |
| (CH₃)₂CH— | O |
| ⌬— | O |
| CH₃CH₂CH₂CH₂— | S |
| ⌬—CH₂ | O |
| (CH₃—CH₂—)₂N—CH₂—CH₂— | S |
| (CH₃CH₂CH₂)₂N—CH₂—CH₂— | O |
| CH₃CH₂NHCH₂CH₂— | S |

We claim:
1. A compound of the formula:

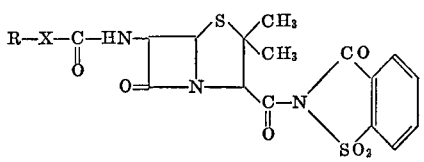

in which
R is a member selected from the group consisting of (lower)alkyl, phenyl, phen(lower)alkyl, naphthyl, 3-pyridyl, 4-pyridyl, mono(lower)alkylamino(lower)alkyl, di(lower)alkylamino(lower)alkyl and quinuclidinyl radicals; and
X is a member selected from the group consisting of sulfur and oxygen.

2. A compound as defined in claim 1 which is: 3,3-dimethyl-7-oxo-2-(3-oxo-1,2-benzisothiazolin - 2 - ylcarbonyl)thio-4-thia-1-azabicyclo[3.2.0]heptane - 6 - carbamic acid S-2-(dimethylamino)ethyl ester, S',S'-dioxide.

3. A compound as defined in claim 1 which is: 3,3-dimethyl-7-oxo-2-(3 - oxo - 1,2-benzisothiazolin-2-ylcarbonyl)-4-thia-1-azabicyclo[3.2.0]heptane - 6 - carbamic acid 3-quinuclidinyl ester S',S'-dioxide.

References Cited
UNITED STATES PATENTS

| 3,383,383 | 5/1968 | Gapp et al. | 260—239.1 |
| 3,399,207 | 8/1968 | Bamberg et al. | 260—239.1 |
| 3,453,264 | 7/1969 | Fosker et al. | 260—239.1 |

NICHOLAS S. RIZZO, Primary Examiner

U.S. Cl. X.R.

424—271